United States Patent

Argaud et al.

(10) Patent No.: US 8,226,353 B2
(45) Date of Patent: Jul. 24, 2012

(54) VENTILATION OF A DOWNSTREAM CAVITY OF AN IMPELLER OF A CENTRIFUGAL COMPRESSOR

(75) Inventors: Thierry Argaud, Chartrettes (FR); Antoine Robert Alain Brunet, Moissy Cramayel (FR); Jean-Christophe Leininger, Paris (FR)

(73) Assignee: SNECMA, Paris (FR)

( * ) Notice: Subject to any disclaimer, the term of this patent is extended or adjusted under 35 U.S.C. 154(b) by 1092 days.

(21) Appl. No.: 11/778,928

(22) Filed: Jul. 17, 2007

(65) Prior Publication Data

US 2010/0028138 A1 Feb. 4, 2010

(30) Foreign Application Priority Data

Jul. 19, 2006 (FR) ...................................... 06 06543

(51) Int. Cl.
*F01D 5/08* (2006.01)

(52) U.S. Cl. .......................... 415/116; 415/144; 415/176

(58) Field of Classification Search ............... 415/211.2, 415/116, 175, 176, 144, 145, 115; 416/95, 416/96 R, 97 R
See application file for complete search history.

(56) References Cited

U.S. PATENT DOCUMENTS

| 2,855,143 | A | * | 10/1958 | Schaer | .......................... 415/144 |
| 3,199,294 | A | * | 8/1965 | Hagen | .............................. 60/796 |
| 4,277,222 | A | * | 7/1981 | Barbeau | ........................ 415/177 |
| 5,601,406 | A | * | 2/1997 | Chan et al. | ..................... 415/206 |
| 5,996,331 | A | * | 12/1999 | Palmer | ............................. 60/782 |
| 6,000,906 | A | * | 12/1999 | Draskovich | ................ 415/209.4 |
| 6,257,834 | B1 | * | 7/2001 | Bremer et al. | ................... 417/53 |
| 2004/0244403 | A1 | * | 12/2004 | Kim et al. | ........................ 62/419 |

FOREIGN PATENT DOCUMENTS

GB 2 401 912 A 11/2004

OTHER PUBLICATIONS

U.S. Appl. No. 11/779,000, filed Jul. 17, 2007, Argaud, et al.
U.S. Appl. No. 11/779,016, filed Jul. 17, 2007, Argaud, et al.
U.S. Appl. No. 11/780,287, filed Jul. 19, 2007, Brunet, et al.
U.S. Appl. No. 11/780,225, filed Jul. 19, 2007, Brunet, et al.

* cited by examiner

*Primary Examiner* — Edward Look
*Assistant Examiner* — Aaron R Eastman
(74) *Attorney, Agent, or Firm* — Oblon, Spivak, McClelland, Maier & Neustadt, L.L.P.

(57) ABSTRACT

A system for ventilating a downstream cavity of an impeller of a centrifugal compressor in a turbomachine, this cavity being delimited by the downstream face of the impeller and by an annular end-piece of a diffuser and being ventilated by taking air from the outlet of the compressor, the system comprising at least one annular deflector mounted in this cavity in order to oppose the rise of hot air along the downstream face of the impeller and in order to cause the diverted hot air to be driven by the air taken from the outlet of the compressor.

15 Claims, 3 Drawing Sheets

VENTILATION OF A DOWNSTREAM CAVITY OF AN IMPELLER OF A CENTRIFUGAL COMPRESSOR

The present invention relates to the ventilation of a downstream cavity of an impeller of a centrifugal compressor in a turbomachine, such as in particular an aircraft turbojet or turboprop.

BACKGROUND OF THE INVENTION

The annular cavity that is formed downstream of the impeller of a centrifugal compressor in a turbomachine must be ventilated to take away the heat energy provided by the impeller. This ventilation is usually carried out by taking air from the outlet of the compressor, at the junction between the inlet of an annular diffuser that supplies a combustion chamber.

This diffuser comprises a downstream annular end-piece with a substantially L-shaped axial section whose substantially radial upstream portion extends, with a slight axial clearance, along the downstream face of the impeller, and whose downstream portion is substantially cylindrical. The air taken from the outlet of the compressor flows from outside to inside in the radial annular space formed between the impeller and the radial portion of the end-piece of the diffuser and then travels into the downstream cavity of the impeller.

In operation, the air in the cavity is subjected to considerable centrifugal forces and is driven by the rotation of the impeller which causes a zone of air recirculation in the cavity and a rise of a portion of this air along the downstream face of the impeller, from inside to outside. This air heats up by viscous friction on the downstream face of the impeller and mixes with the tapped-off air coming out of the compressor, increasing the temperature of this air. By convection, this air again heats the downstream face of the impeller, which may reach and exceed a maximum admissible value, which results in a creep of material.

The particular objective of the invention is to provide a simple, effective and economic solution to this problem of the prior art.

SUMMARY OF THE INVENTION

Accordingly, it proposes a system for ventilating a downstream cavity of an impeller of a centrifugal compressor in a turbomachine, this cavity being delimited by the downstream radial face of the impeller and by a downstream annular end-piece of an annular diffuser arranged at the outlet of the compressor and being ventilated by taking air from the outlet of the compressor, the tapped-off air circulating downstream in the cavity and toward the axis of rotation of the compressor, wherein at least one annular deflector is mounted in this cavity and extends between the downstream face of the impeller and the annular downstream end-piece of the diffuser in order to oppose the return of hot air along the downstream face of the impeller and to cause the diverted hot air to be driven by the air taken from the outlet of the compressor.

The annular deflector according to the invention prevents the rise of hot air along the downstream face of the impeller and forms a reduction of the passageway section of the air taken from the outlet of the compressor, in order to accelerate this air and cause a shearing of the hotter air that has risen along the radial face of the impeller and that has been diverted by the deflector, and a driving of this hotter air along the cylindrical portion of the annular end-piece of the diffuser.

According to another feature of the invention, the deflector is situated radially at the junction between a radial portion and a cylindrical portion of the annular downstream end-piece of the diffuser.

It is here that the deflector is most effective, in terms of diversion of the hotter air that has risen along the downstream face of the impeller, in terms of the shearing and the driving of this hotter air by the air taken from the outlet of the compressor.

In one embodiment of the invention, the deflector is formed as a protrusion on the downstream face of the impeller and has a substantially cylindrical shape. Preferably, this deflector extends axially to near the annular downstream end-piece of the diffuser, and has an axial dimension greater than or equal to the thickness of the layer of hot air rising along the impeller.

This hot air is diverted downstream by the deflector of the impeller and is then driven by the air that is taken from the outlet of the compressor and that passes between the deflector and the end-piece of the diffuser.

In a variant embodiment of the invention, the deflector is formed as a protrusion on the annular end-piece of the diffuser and extends axially upstream to near the impeller. This deflector is preferably formed at the junction between the radial portion and the cylindrical portion of the end-piece of the diffuser.

The air that flows from the outlet of the compressor between the downstream face of the impeller and the deflector of the end-piece prevents the hotter air from rising along this downstream face.

In another variant, a first deflector is formed as a protrusion on the downstream face of the impeller and a second deflector is formed as a protrusion on the annular downstream end-piece of the diffuser, these deflectors extending toward one another and delimiting between them an annular outlet passageway for the air taken from the outlet of the compressor. Preferably, the deflector formed on the impeller is situated radially inside the deflector formed on the annular end-piece of the diffuser.

In yet another variant, the deflector is formed as a protrusion on an annular heat protection shield covering the downstream face of the impeller and rotating with the impeller, this deflector extending downstream to near the end-piece of the diffuser. This deflector is preferably situated at the junction between the radial and cylindrical portions of the end-piece of the diffuser.

The deflector may have a square, rectangular or triangular shape in axial section.

The invention also relates to a turbomachine, such as an aircraft turbojet or turboprop, which comprises a system for ventilating a downstream cavity of the impeller as described above.

BRIEF DESCRIPTION OF THE DRAWINGS

The invention will be better understood and other details, features and advantages of the present invention will appear on reading the following description made as a nonlimiting example and with reference to the appended drawings in which.

DESCRIPTION OF THE PREFERRED EMBODIMENTS

Figure 1:
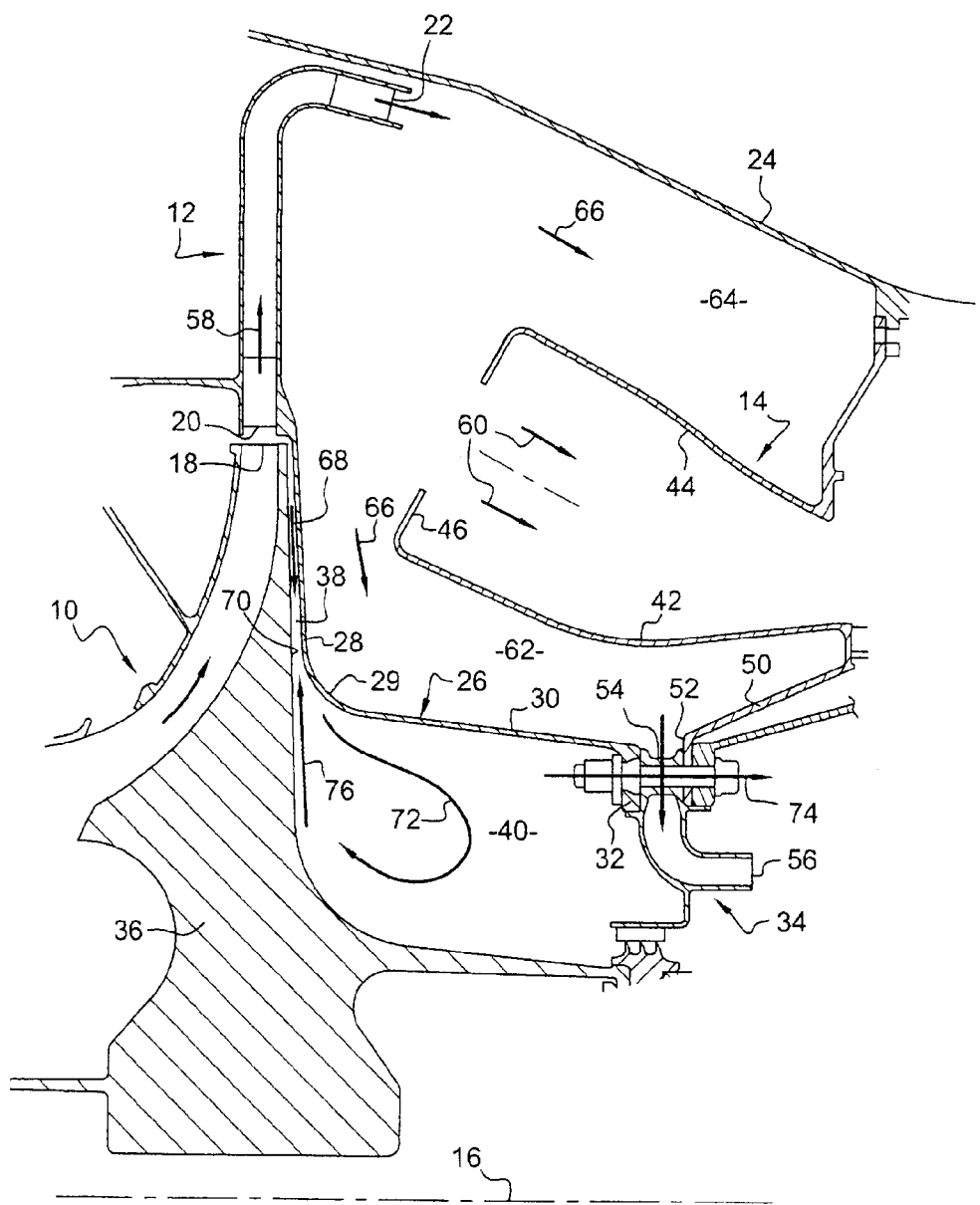
FIG. 1 is a schematic half-view in axial section of a ventilation system according to the prior art.

FIG. 1 represents a portion of a turbomachine, such as an aircraft turbojet or turboprop, comprising, from upstream to downstream, in the direction of flow of the gases inside the turbomachine, a centrifugal compressor stage 10, a diffuser 12 and a combustion chamber 14.

The inlet of the compressor stage 10 is oriented upstream, substantially parallel to the axis 16 of the turbomachine, and its outlet 18 is oriented radially outward, substantially perpendicularly to the axis 16 of the turbomachine.

The diffuser 12 has an annular shape bent at 90° and comprises an inlet 20 aligned with the outlet 18 of the compressor, and an outlet 22 that is oriented downstream and opens radially to the outside of the combustion chamber 14.

The diffuser 12 is supported by an external casing 24 that externally surrounds the compressor 10, the diffuser 12 and the combustion chamber 14.

The diffuser 12 comprises a downstream annular end-piece 26 with a substantially L-shaped section that comprises a substantially radial upstream portion 28 that extends inward from the inlet 20 of the diffuser 12, and a substantially cylindrical downstream portion 30 that terminates at its downstream end in an annular flange 32 attached by appropriate means of the screw-nut type to means 34 for injecting air for the ventilation and/or cooling of components (particularly turbine components) situated downstream of the combustion chamber 14.

The junction 29 between the radial portion 28 and the cylindrical portion 30 of the end-piece has a rounded shape in axial section and comprises a concave annular surface oriented downstream and outward and a convex annular surface oriented upstream and inward.

The radial portion 28 of the end-piece 26 extends, with a slight axial clearance, downstream and along the impeller 36 of the compressor, this axial clearance increasing slightly in the direction of the axis 16 of rotation of the impeller and being greatest at the aforementioned junction 29 of the end-piece.

The end-piece 26 delimits, with a downstream radial face 70 of the impeller 36, an annular cavity 40 that communicates with the outlet of the compressor via the radial annular space 38 formed between the impeller 36 and the radial portion 28 of the end-piece.

The combustion chamber 14 comprises two coaxial walls of revolution 42, 44 extending one inside the other and connected at their upstream ends to a chamber-bottom wall 46, these walls 42, 44 and 46 delimiting between them an annular enclosure into which fuel is brought by injectors.

The radially external wall 44 of the chamber is attached at its downstream end to the external casing 24, and its radially internal wall 42 is connected at its downstream end to a frustoconical ring 50 that comprises at its radially internal end an internal annular flange 52 for attachment to the aforementioned injection means 34.

These injection means 34 comprise an annular duct bent at a right angle whose inlet 54 opens radially outward and is situated downstream of the flange 32 of the end-piece and upstream of the flange 52 of the ring 50, and whose outlet 56 is oriented downstream and is situated radially inside the ring 50.

The majority of the airflow coming out of the compressor stage 10 passes into the diffuser 12 (arrow 58) and supplies the combustion chamber 14 (arrows 60) and an internal annular stream 62 and external annular stream 64 going round the combustion chamber 14 (arrows 66), the internal stream 62 supplying the injection means 34.

A small portion of the airflow coming out of the centrifugal compressor 10 (arrow 68) travels into the radial space 38 formed between the impeller 36 of the compressor and the radial portion 28 of the end-piece 26 of the diffuser in order to ventilate the downstream cavity 40 of the impeller and therein prevent an accumulation of heat generated by viscous friction of the air driven by the rotation of the impeller.

The ventilation air is carried away (arrow 74) downstream by orifices provided in the flanges 32 and 52 of the end-piece 26 and of the ring 50 and aligned with corresponding orifices provided on the injection means 34.

In operation, an air recirculation zone 72 is created in the cavity 40 under the effect of the centrifugal forces and the rotation of the impeller. A portion of this air rises (arrow 76) along the impeller 36, from inside to outside and heats up by viscous friction on the downstream face 70 of the impeller. This hot air 76 mixes with the air 68 taken from the outlet of the compressor and increases its temperature, this mixture of air being able by convection to raise the temperature of the downstream face of the impeller, which represents a risk of damaging the impeller.

The invention provides a solution to this problem thanks to at least one annular deflector that extends about the axis 16 of rotation of the impeller, between the end-piece 26 of the diffuser and the downstream face 70 of the impeller, and that makes it possible to divert downstream the hot air rising along this face.

Figure 2:
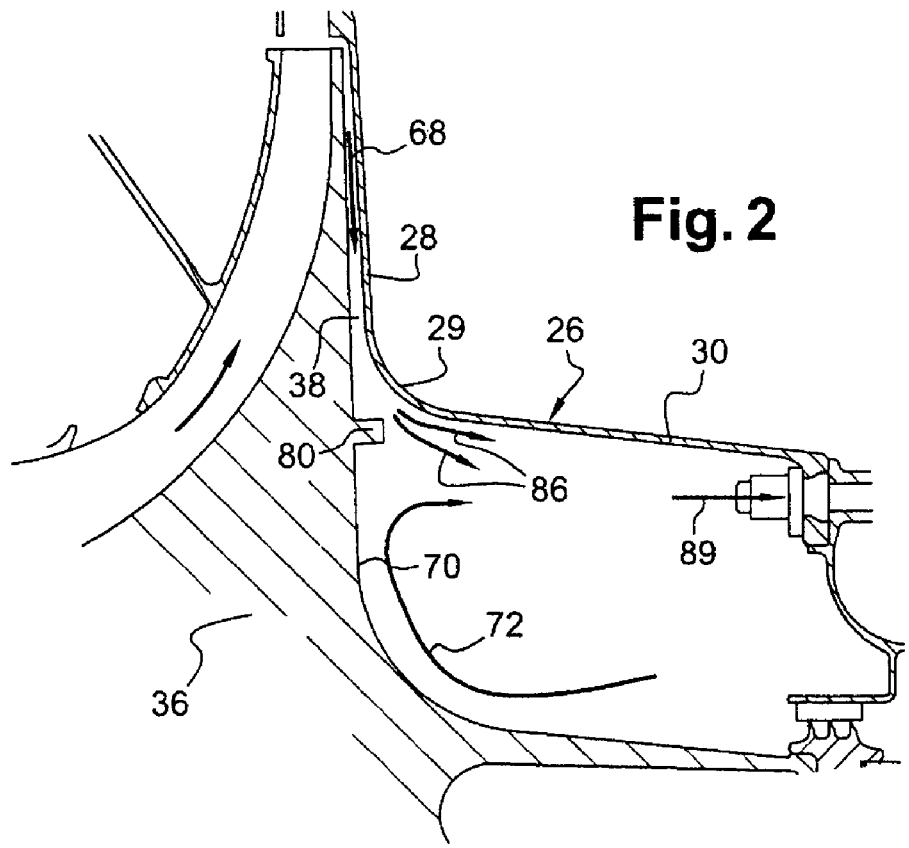
FIG. 2 is a partial schematic view in axial section of a ventilation system according to the invention.

In the embodiment of FIG. 2, the deflector 80 is formed as a protrusion on the downstream face 70 of the impeller 36 and is situated radially at the junction 29 between the radial portion 28 and cylindrical portion 30 of the end-piece 26.

The deflector 80 has a shape that is for example square in axial section and extends axially to a short distance from the junction 29 of the end-piece 26, defining with the latter an annular outlet passageway for the air from the radial space 38.

The air that comes out of the radial space 38 through this passageway is accelerated and flows about the axis of rotation of the compressor and from upstream to downstream along the cylindrical portion 30 of the end-piece (arrows 86). It drives downstream the hotter air that has risen along the radial face 70 of the impeller and that has been diverted downstream by the deflector 80, and is then carried away through the aforementioned orifices of the flanges 32, 52 and of the injection means 34 (arrow 89).

The deflector 80 may be formed in a single piece with the impeller 36, as is shown, or be fitted and attached to the downstream face 70 of the impeller. The axial dimension of the deflector 80 is equal to or greater than the thickness of the layer of hot air rising up the downstream face 70 of the impeller in order to divert downstream the totality of this layer of air. Typically, the axial dimension of the deflector 80 is approximately 1 cm.

Figure 3:
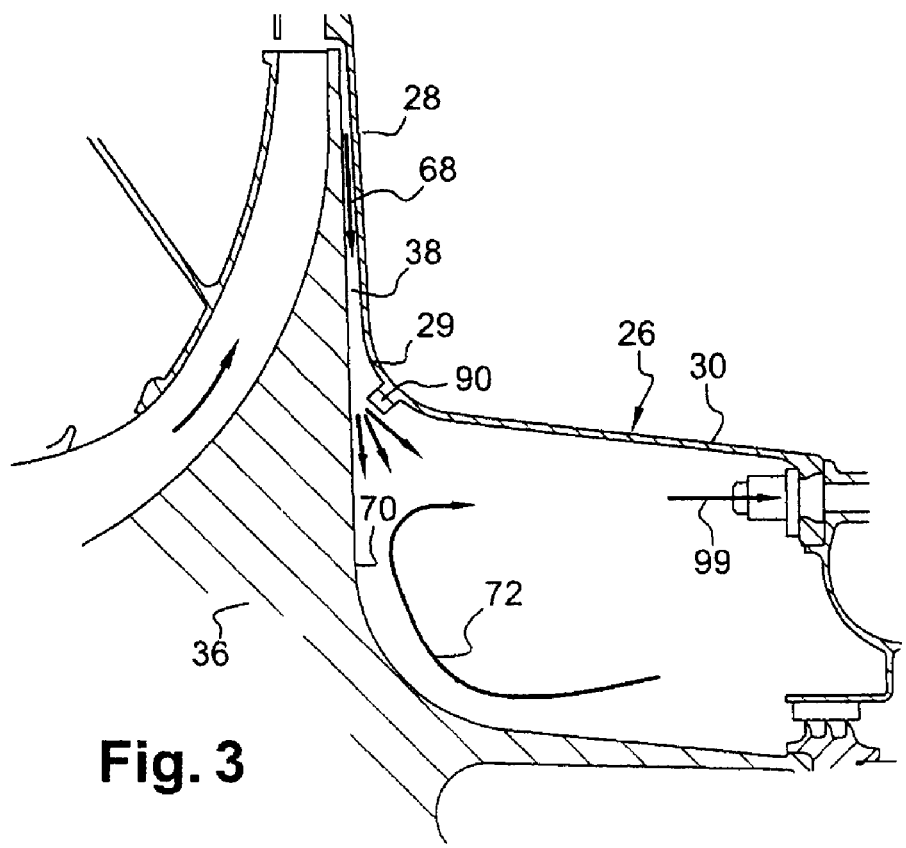
FIG. 3 is a view corresponding to FIG. 2 and represents a variant embodiment of the invention.

As a variant and as shown in FIG. 3, the deflector 90 is formed as a protrusion on the end-piece 26 of the diffuser, at the junction 29 of the end-piece, and extends axially upstream to near the impeller 36.

The deflector 90 has an approximately square shape in axial section and terminates at a short axial distance from the downstream face 70 of the impeller, defining with the latter an annular outlet passageway for air from the radial space 38.

The air taken from the outlet of the compressor is accelerated in this outlet passageway and opposes the rise of the hotter air on the downstream face of the impeller. As shown in FIG. 3 by the arrows, this hotter air is diverted by the air coming out of the passageway formed between the impeller and the deflector 90 and is driven toward the orifices of the flanges 32, 52 and of the injection means 34 (arrow 99).

The deflector 90 may be formed in a single piece with the end-piece 26 of the diffuser or else be fitted to this end-piece.

Figure 4:
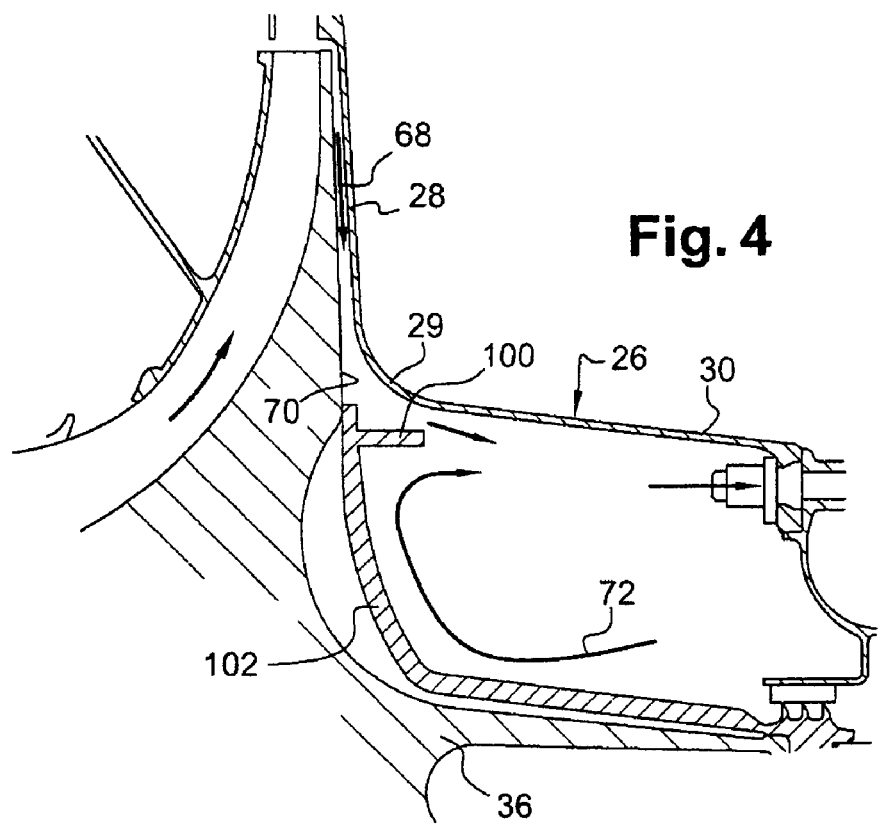
FIG. 4 is a view corresponding to FIG. 2 and represents a variant of the invention.

In the variant shown in FIG. 4, the deflector 100 is supported by an annular heat protection shield 102 that is fixedly attached in rotation to the impeller 36, and that covers the downstream face 70 of the impeller, the radially external end of the shield being situated approximately at the junction 29 of the end-piece.

The shield 102 prevents the hotter air that flows in the downstream cavity 40 from coming into contact with the downstream face of the impeller.

The deflector 100 is formed as a protrusion close to the radially external end of the shield 102 and extends axially downstream inside the junction 29 of the end-piece 26 and at a short radial distance from the latter. This deflector 100 has for example a rectangular shape in axial section and terminates a short distance from the junction 29 of the end-piece 26, defining with the latter an annular outlet passageway for air from the radial space 38.

For the operation of this ventilation system, therefore, reference should now be made to the case of FIG. 2. The deflector 100 may be fitted and attached to the shield 102 or formed as a single piece with this shield.

Figure 5:
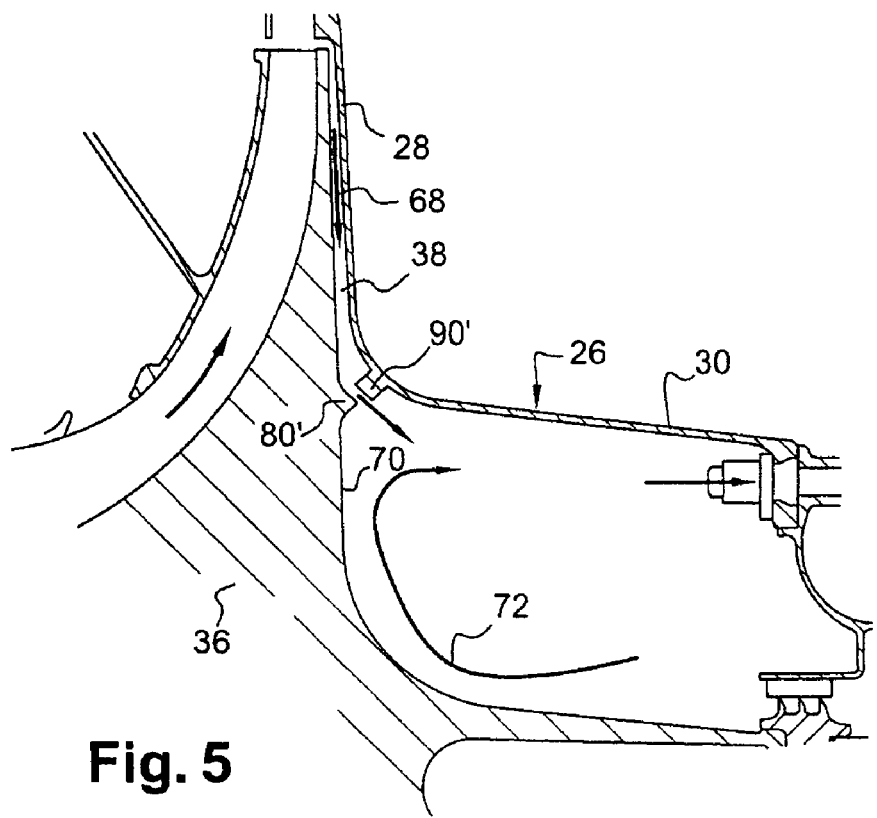
FIG. 5 is a view corresponding to FIG. 2 and represents yet another variant of the invention.

In the variant of FIG. 5, two deflectors 80', 90' are supported respectively by the impeller 36 and the end-piece 26 of the diffuser, and define between them an annular outlet passageway for air from the radial space 38, which corresponds to a combination of the embodiments of FIGS. 2 and 3.

The deflector 80' supported by the impeller 36 has a triangular shape in axial section whose apex is oriented toward the end-piece 26.

The deflector 90' of the end-piece is substantially identical to the deflector 90 of FIG. 3 and extends axially around the deflector 80'. The operations of the embodiments of FIGS. 2 and 3 are combined.

The invention claimed is:

1. A system for ventilating a downstream cavity of an impeller of a centrifugal compressor in a turbomachine, said downstream cavity being delimited by a downstream radial face of the impeller and by a downstream annular end-piece of an annular diffuser arranged at the outlet of the compressor, said downstream annular end-piece having an L-shaped axial section and comprising a substantially radial upstream portion which extends along the downstream radial face of the impeller and which is connected by its outer end to an inlet of the annular diffuser and by its inner end to an upstream end of a substantially cylindrical downstream portion, said downstream cavity being ventilated by tapped-off air from the outlet of the compressor, the tapped-off air circulating downstream in the cavity and toward the axis of rotation of the compressor, wherein at least one annular deflector is mounted in said downstream cavity and extends between said downstream radial face of the impeller and said downstream annular end-piece of the annular diffuser in order to oppose a return of hot air along said downstream radial face of the impeller, to accelerate the tapped-off air from the outlet of the compressor, and to cause said hot air to be driven by the accelerated tapped-off air from the outlet of the compressor, wherein the annular deflector has a square, rectangular or triangular shape in axial section, and is situated radially at a junction between the substantially radial upstream portion and the substantially cylindrical portion of the downstream annular end-piece, the junction having a rounded shape in axial section and including a concave annular surface oriented downstream and outward and a convex annular surface oriented upstream and inward.

2. The system as claimed in claim 1, wherein said annular deflector is formed as a protrusion on the downstream radial face of the impeller and has a substantially cylindrical shape.

3. The system as claimed in claim 2, wherein said annular deflector extends axially to near the downstream annular end-piece of the annular diffuser.

4. The system as claimed in claim 2, wherein said annular deflector has an axial dimension greater than or equal to a thickness of the layer of said hot air rising along said downstream radial face of the impeller.

5. The system as claimed in claim 1, wherein said annular deflector is formed as a protrusion on the downstream annular end-piece of the annular diffuser and extending axially upstream to near the impeller.

6. The system as claimed in claim 5, wherein said annular deflector is formed at a junction between a radial portion and a cylindrical portion of the downstream annular end-piece of the annular diffuser.

7. The system as claimed in claim 1, which comprises a first deflector formed as a protrusion on the downstream radial face of the impeller and a second deflector formed as a protrusion on the downstream annular end-piece of the annular diffuser, said first and second deflectors extending toward one another and delimiting an annular outlet passageway for the tapped-off air from the outlet of the compressor.

8. The system as claimed in claim 7, wherein the first deflector is situated radially inside the second deflector.

9. The system as claimed in claim 1, wherein said annular deflector is formed as a protrusion on an annular heat protection shield covering the downstream radial face of the impeller, said annular deflector extending downstream to near the downstream annular end-piece of the annular diffuser.

10. The system as claimed in claim 9, wherein said annular deflector formed on the annular heat protection shield extends to a junction between radial and cylindrical portions of the downstream annular end-piece of the annular diffuser.

11. A turbomachine, which comprises downstream, in a direction of flow of gases inside the turbomachine, a centrifugal compressor, a diffuser, and a combustion chamber, and a system for ventilating the downstream cavity of the impeller of the centrifugal compressor as claimed in claim 1.

12. The system as claimed in claim 1, said system further comprising said centrifugal compressor, said annular diffuser downstream of said centrifugal compressor, and a combustion chamber downstream of said annular diffuser.

13. The system as claimed in claim 1, wherein a downstream end of said substantially cylindrical downstream portion includes an annular flange attached to an air injecting device.

14. A system for ventilating a downstream cavity of an impeller of a centrifugal compressor in a turbomachine, said downstream cavity being delimited by a downstream radial face of the impeller and by a downstream annular end-piece of an annular diffuser arranged at an outlet of the compressor, said downstream annular end-piece having an L-shaped axial section and comprising a substantially radial upstream portion which extends along the downstream radial face of the impeller and which is connected by its outer end to an inlet of the annular diffuser and by its inner end to an upstream end of a substantially cylindrical downstream portion, said downstream cavity being ventilated by tapped-off air from the outlet of the compressor, and tapped-off air circulating downstream in the cavity and toward the axis of rotation of the compressor, wherein at least one annular deflector is mounted in said downstream cavity and extends between said downstream radial face of the impeller and said downstream annular end-piece of the annular diffuser in order to oppose a return of hot air along said downstream radial face of the impeller, to accelerate the tapped-off air from the outlet of the compressor, and to cause said hot air to be driven by the accelerated tapped-off air from the outlet of the compressor, and wherein said annular deflector is formed as a protrusion on the downstream radial face of the impeller, is situated radially at a junction between the substantially radial upstream portion and the substantially cylindrical portion of the downstream annular end-piece, and has an axial dimension greater than or equal to a thickness of a layer of said hot air rising along said downstream radial face of the impeller, the junction having a rounded shape in axial section and including a concave annular surface oriented downstream and outward and a convex annular surface oriented upstream and inward.

15. A system for ventilating a downstream cavity of an impeller of a centrifugal compressor in a turbomachine, said downstream cavity being delimited by a downstream radial face of the impeller and by a downstream annular end-piece of an annular diffuser arranged at an outlet of the compressor, said downstream annular end-piece having an L-shaped axial section and comprising a substantially radial upstream portion which extends along the downstream radial face of the impeller and which is connected by its outer end to an inlet of the annular diffuser and by its inner end to an upstream end of a substantially cylindrical downstream portion, said downstream cavity being ventilated by tapped-off air from the outlet of the compressor, the tapped-off air circulating downstream in the cavity and toward the axis of rotation of the compressor, wherein at least one annular deflector is mounted in said downstream cavity and extends between said downstream radial face of the impeller and said downstream annular end-piece of the annular diffuser in order to oppose a return of hot air along said downstream radial face of the impeller, to accelerate the tapped-off air from the outlet of the compressor, and to cause said hot air to be driven by the accelerated tapped-off air from the outlet of the compressor, and wherein said annular deflector is formed as a protrusion on the downstream annular end-piece of the annular diffuser, is situated radially at a junction between the substantially radial upstream portion and the substantially cylindrical portion of the downstream annular end-piece, and extending axially upstream to near the impeller.

\* \* \* \* \*